United States Patent
Johnson

(10) Patent No.: US 10,850,347 B2
(45) Date of Patent: Dec. 1, 2020

(54) LINEAR FRICTION WELDING SYSTEM WITH PRE-HEATING

(71) Applicant: APCI, LLC, South Bend, IN (US)

(72) Inventor: Stephen A. Johnson, South Bend, IN (US)

(73) Assignee: APCI, LLC IN (US)

( * ) Notice: Subject to any disclaimer, the term of this patent is extended or adjusted under 35 U.S.C. 154(b) by 136 days.

(21) Appl. No.: 16/136,037

(22) Filed: Sep. 19, 2018

(65) Prior Publication Data
US 2020/0086421 A1    Mar. 19, 2020

(51) Int. Cl.
*B23K 20/12* (2006.01)

(52) U.S. Cl.
CPC ........ *B23K 20/1205* (2013.01); *B23K 20/121* (2013.01); *B23K 20/123* (2013.01)

(58) Field of Classification Search
CPC .. B29C 65/06–069; B23K 20/12–1215; B23K 20/1285–1295
USPC .......... 228/112.1–114.5, 2.1–2.3, 110.1, 1.1; 156/73.1–73.5, 580.1–580.2
See application file for complete search history.

(56) References Cited

U.S. PATENT DOCUMENTS

| | | | |
|---|---|---|---|
| 3,058,513 A | 10/1962 | Schaub et al. |
| 3,388,849 A | 6/1968 | Blum et al. |
| 3,542,275 A | 11/1970 | Loyd et al. |
| 3,554,845 A | 1/1971 | Billett et al. |
| 3,591,068 A | 7/1971 | Farmer et al. |
| 3,671,049 A | 6/1972 | Stamm |
| 3,701,708 A | 10/1972 | Brown et al. |
| 3,791,569 A | 2/1974 | Mims |
| 3,822,821 A | 7/1974 | Clarke |
| 3,848,792 A | 11/1974 | Mims |
| 3,860,468 A | 1/1975 | Scherer |
| 3,920,504 A | 11/1975 | Shoh et al. |
| 3,972,465 A | 8/1976 | Takaoka et al. |
| 4,043,497 A | 8/1977 | Jones |
| 4,087,036 A | 5/1978 | Corbett et al. |
| 4,247,346 A | 1/1981 | Maehara et al. |
| 4,270,495 A | 6/1981 | Freudenstein et al. |
| 4,470,868 A | 9/1984 | MacLaughlin et al. |

(Continued)

FOREIGN PATENT DOCUMENTS

JP     10264255 A  * 10/1998  ........... B29C 66/964
JP  WO 2018/155307 A  *  8/2018

*Primary Examiner* — Kiley S Stoner
(74) *Attorney, Agent, or Firm* — Maginot, Moore & Beck, LLP

(57) ABSTRACT

A linear friction welding system in one embodiment includes a welding control system operably connected to a hydraulic press and a ram, the welding control system including a processing circuit operably connected to a memory and configured to execute program instructions stored in the memory to bring a shaped charge portion of a first component to be welded into contact with a second component to be welded, and establish an initial scrub load pressure between the two components based upon a ratio between initial surface area of a contact initiation portion of the shaped charge portion and a final surface area of the first component. The processing circuit increases pressure between the components from the initial scrub load pressure to a target scrub load pressure before terminating oscillation of the ram and establishing or maintaining a weld load pressure.

14 Claims, 6 Drawing Sheets

(56) References Cited

U.S. PATENT DOCUMENTS

| | | | |
|---|---|---|---|
| 4,552,609 A | 11/1985 | Larsen | |
| 4,811,887 A | 3/1989 | King et al. | |
| 4,858,815 A | 8/1989 | Roberts et al. | |
| 4,905,883 A * | 3/1990 | Searle | B23K 20/1205 228/2.1 |
| 4,936,502 A * | 6/1990 | Schlarb | B29C 65/0618 156/580.1 |
| 4,995,544 A | 2/1991 | Searle | |
| 5,100,044 A | 3/1992 | Searle | |
| 5,141,591 A | 8/1992 | Boek et al. | |
| 5,248,077 A | 9/1993 | Rhoades et al. | |
| 5,366,344 A | 11/1994 | Gillbanks et al. | |
| 5,853,119 A | 12/1998 | Searle | |
| 6,003,752 A | 12/1999 | Searle et al. | |
| 6,102,272 A | 8/2000 | Searle et al. | |
| 6,145,730 A | 11/2000 | Wiesemann | |
| 6,328,087 B1 | 12/2001 | Finzo et al. | |
| 6,357,506 B1 | 3/2002 | Nomura et al. | |
| 6,688,512 B2 | 2/2004 | Trask | |
| 6,779,708 B2 | 8/2004 | Slattery | |
| 7,882,996 B2 | 2/2011 | Alessi et al. | |
| 8,070,039 B1 * | 12/2011 | Johnson | B23K 20/1205 228/2.1 |
| 8,181,841 B2 | 5/2012 | Johnson et al. | |
| 8,376,210 B2 | 2/2013 | Johnson et al. | |
| 8,967,216 B2 | 3/2015 | Johnson | |
| 10,569,355 B2 * | 2/2020 | Johnson | B23K 20/1205 |
| 2004/0216432 A1 | 11/2004 | Lopez | |
| 2004/0256439 A1 | 12/2004 | Pfeiler | |
| 2006/0113358 A1 | 6/2006 | Crasser | |
| 2006/0231593 A1 | 10/2006 | Bayer et al. | |
| 2009/0145948 A1 | 6/2009 | Pfeiler | |
| 2009/0321497 A1 | 12/2009 | Alessi et al. | |
| 2010/0163601 A1 * | 7/2010 | Grooms | B23K 20/12 228/102 |
| 2011/0056629 A1 | 3/2011 | Kawaura et al. | |
| 2012/0168057 A1 * | 7/2012 | Kanamoto | B29C 65/0618 156/73.1 |
| 2013/0139968 A1 * | 6/2013 | Johnson | B23K 20/1205 156/350 |
| 2013/0255619 A1 * | 10/2013 | Mizuno | B23K 11/093 123/193.5 |
| 2014/0050519 A1 * | 2/2014 | Oiwa | B23K 20/12 403/270 |
| 2014/0325842 A1 * | 11/2014 | Johnson | B23K 20/1205 29/889.21 |
| 2014/0326414 A1 * | 11/2014 | Johnson | B29C 65/0618 156/580 |
| 2014/0326781 A1 * | 11/2014 | Johnson | B23K 20/1205 228/112.1 |
| 2014/0338841 A1 * | 11/2014 | Johnson | B23K 20/1205 156/580.1 |
| 2017/0036298 A1 * | 2/2017 | Johnson | B23K 20/1205 |
| 2020/0001392 A1 * | 1/2020 | Fujita | B23K 20/12 |
| 2020/0086420 A1 * | 3/2020 | Gorski | B23K 20/1205 |

* cited by examiner

LINEAR FRICTION WELDING SYSTEM WITH PRE-HEATING

FIELD OF THE INVENTION

The present disclosure relates to linear friction welding.

BACKGROUND

Friction welding (FW) is a process of joining two components which may be made from the same or different materials. The FW process typically involves pressing one of the two components against the other component with a large amount of force and rapidly moving one of the two components with respect to the other component to generate friction at the interface of the two components. The pressure and movement generate sufficient heat to cause the components to begin to plasticize. Once the two components are plasticized at the contact interface, the relative movement of the two components is terminated and an increased force is applied. As the components cool in this static condition, a weld is formed at the contact interface.

The weld obtained using FW is a solid state bond which is highly repeatable and easily verifiable. For example, the amount of material donated by each component to the formation of the weld, which is referred to as "upset", is well defined. Therefore, by carefully controlling the energy input into the FW system in the form of friction and forging pressure, the measured upset of a welded assembly provides verification as to the nature of the weld obtained.

As discussed above, relative movement of the two components is a critical facet of FW. Different approaches have been developed to provide the required relative movement. One widely used approach is rotational friction welding (RFW). RFW involves rotation of one component about a weld axis. RFW provides many benefits and is thus a favored welding approach in various industries including aerospace and energy industries.

RFW, however, does have some limitations. For example, in forming a weld, the interface between the two components must be evenly heated to generate a uniform plasticity within each of the components throughout the weld interface. If one area becomes hotter than another area, the material in that hotter area will be softer, resulting in an incongruity in the formed weld. To provide consistent heat generation throughout the component interface, the rotated component is necessarily uniformly shaped about the axis of rotation, i.e., circular. Moreover, since the heat generated is a function of the relative speed between the two materials, more heat will be generated toward the periphery of the rotated component since the relative speed at the periphery is higher than the relative speed at the rotational axis.

In response to the limitations of RFW, linear friction welding (LFW) was developed. In LFW, the relative movement is modified from a rotational movement to a vibratory/oscillatory movement along a welding axis. By controlling the amplitude and the frequency of the linear movement, the heat generated at the component interface can be controlled.

LFW thus allows for welding of a component that exhibits substantially uniform width. LFW, like RFW, is subject to various limitations. One such limitation is that in order to achieve the frequency and amplitude necessary to realize a weld, a LFW device must provide for rapid acceleration from a dead stop. The moving component must then be completely stopped and reaccelerated in a reverse direction. As the size of the vibrated component increases, the momentum that must be controlled becomes problematic. Thus, traditional LFW devices incorporate massive components which are very expensive.

In response to limitations in LFW devices, U.S. Pat. No. 8,070,039, which issued Dec. 6, 2011 disclosed a LFW device with two power shafts. The phasing of the two power shafts in the '039 patent, the entire content of which is herein incorporated by reference, is controlled in order to generate an oscillatory movement of a ram which forces movement between two workpieces which are forced together by a pressing assembly.

As noted above, one issue which arises in RFW is uneven heating of the components. In some instances, LFW processes can also exhibit uneven heating of the components. This can arise, for example, when one of the pieces is not sufficiently smooth. Specifically, a scrub phase is commonly used in LFW to raise the temperature of both components to a temperature whereat the abutting surfaces of the components plasticize. During the scrub phase, the pressure of the system is established at a level which is sufficient to generate the friction necessary to plasticize the abutting surfaces of the components.

During the scrub phase, however, areas on the abutting surfaces which are higher than surrounding areas are more quickly heated which results in localized plasticization. Since the plasticized areas are hotter than the surrounding areas, which are not plasticized, the plasticized area is believed to exhibit more rapid cooling than the surrounding areas once the high spot is plasticized. This occurs in part because the friction at the localized plasticized areas is significantly reduced. The plasticized area in some instances is believed to cool sufficiently to re-solidify. When re-solidification occurs between the components over a sufficiently large area, the re-solidification results in a premature localized welding. As the system continues the scrub phase, either the weld will fracture, which may cause damage to the components, or the weld will be sufficiently strong to bind the vibratory system thereby damaging in the LFW system.

In order to avoid the problems which arise due to uneven surfaces, the components are pre-heated in some processes prior to applying pressure between the components. To this end, torches, inductive heaters, and the like are used. These approaches, however, add complexity to the LFW process. Moreover, torches and the like may not provide a consistent pre-heating to components.

A LFW system and method which provides consistent preheating of components would be beneficial. A LFW system and method which allows for reduced system complexity would be further beneficial.

SUMMARY

The present disclosure in one embodiment is a linear friction welding system that includes a ram configured to oscillate along a welding axis, a hydraulic press, and a welding control system operably connected to the hydraulic press and the ram. The welding control system includes a memory, program instructions stored within the memory, a parameter database stored within the memory, and a processing circuit operably connected to the memory. The processing circuit in some embodiments executes the program instructions to bring a shaped charge portion of a first component to be welded into contact with a second component to be welded and establish an initial scrub load pressure ($L_0$) between the first component and the second component based upon a ratio between initial surface area ($A_0$) of a contact initiation portion of the shaped charge portion and a final surface area ($A_1$) of the first component. The processing circuit then controls the hydraulic press to increase pressure between the first component and the second component from the $L_0$ to a target scrub load pressure ($L_{scrub}$) after which oscillation of the ram is terminated. Then a weld load pressure ($L_{weld}$) is established. In one or more embodiments, the $L_0$ is determined based upon the equation:

$$L_0 = \frac{A_0}{A_1} L_{scrub}.$$

In one or more embodiments, the $L_{scrub}$ is in the range of 0.25 $L_{weld}$ to 1.00 L inclusive.

In one or more embodiments, the processing circuit is configured to execute the program instructions to control the hydraulic press to increase pressure between the first component and the second component from the $L_0$ to the $L_{scrub}$ based upon a predetermined time duration of a scrub.

In one or more embodiments, the processing circuit is configured to execute the program instructions to control the hydraulic press to increase pressure between the first component and the second component from the $L_0$ to the $L_{scrub}$ based upon the predetermined time duration of the scrub based upon the equation:

$$L_t = \left(t + \frac{(T-t)A_0}{A_1}\right) \frac{L_{scrub}}{T}$$

wherein:

$L_t$ is the load at time (t) after initiation of the scrub, and T is the predetermined time duration of the scrub in seconds.

In one or more embodiments, the system further includes a sensor configured to detect movement of the first component along an axis of the hydraulic press, the sensor operably connected to the processing circuit, wherein the processing circuit is configured to execute the program instructions to control the hydraulic press to increase pressure between the first component and the second component from the $L_0$ to the $L_{scrub}$ based upon detected movement of the first component during a scrub.

In one or more embodiments, the processing circuit is configured to execute the program instructions to control the hydraulic press to increase pressure between the first component and the second component from the $L_0$ to the $L_{scrub}$ based upon the detected movement of the first component during the scrub based upon the equation:

$$L_d = \left(d + \frac{(SCH-d)A_0}{A_1}\right) \frac{L_{scrub}}{SCH}$$

wherein $L_d$ is the load (L) at distance (d) over which the first component has travelled after initial contact between the contact initiation portion of the first component and the second component, and SCH is the height of the shaped charge portion along the axis of the hydraulic press.

In accordance with one embodiment, a method of welding a first component to a second component using a linear friction welding system includes bringing a shaped charge portion of the first component into contact with the second component. The method includes establishing an initial scrub load pressure ($L_0$) between the first component and the second component based upon a ratio between an initial surface area ($A_0$) of a contact initiation portion of the shaped charge portion and a final surface area ($A_1$) of the first component by controlling a hydraulic press with a processing circuit of a welding control system which executes program instructions stored within a memory. Then, the hydraulic press is controlled with the processing circuit to increase pressure between the first component and the second component from the $L_0$ to a target scrub load pressure ($L_{scrub}$) based upon parameters stored in a memory. The processing circuit then controls a ram operably connected to one of the first component and the second component to terminate oscillation of the ram after establishing the $L_{scrub}$, and controls the hydraulic press to establish or maintain a weld load pressure ($L_{weld}$) after terminating oscillation of the ram.

In one or more embodiments, a method includes determining the $L_0$ based upon the equation:

$$L_0 = \frac{A_0}{A_1} L_{scrub}.$$

In one or more embodiments, a method includes establishing $L_{scrub}$ in the range of 0.25 $L_{weld}$ to 1.00 $L_{weld}$, inclusive.

In one or more embodiments, a method includes executing the program instructions with the processing circuit to control the hydraulic press to increase pressure between the first component and the second component from the $L_0$ to the $L_{scrub}$ based upon a predetermined time duration of a scrub.

In one or more embodiments, a method includes executing the program instructions with the processing circuit to control the hydraulic press to increase pressure between the first component and the second component from the $L_0$ to the $L_{scrub}$ based upon the time duration of the scrub based upon the equation:

$$L_t = \left(t + \frac{(T-t)A_0}{A_1}\right) \frac{L_{scrub}}{T}$$

wherein:

$L_t$ is the load at time (t) after initiation of the scrub, and T is the predetermined time duration of the scrub in seconds.

In one or more embodiments, a method includes detecting movement of the first component along an axis of the hydraulic press with a sensor. The method further includes executing the program instructions with the processing circuit to control the hydraulic press to increase pressure between the first component and the second component from the $L_0$ to the $L_{scrub}$ based upon the detected movement of the first component.

In one or more embodiments, a method includes executing the program instructions with the processing circuit to control the hydraulic press to increase pressure between the first component and the second component from the $L_0$ to the $L_{scrub}$ based upon the detected movement of the first component based upon the equation:

$$L_d = \left(d + \frac{(SCH-d)A_0}{A_1}\right) \frac{L_{scrub}}{SCH}$$

wherein: $L_d$ is the load (L) at distance (d) over which the first component has travelled after initial contact between the contact initiation portion of the first component and the second component, and SCH is the height of the shaped charge portion along the axis of the hydraulic press.

The above described features and advantages, as well as others, will become more readily apparent to those of ordinary skill in the art by reference to the following detailed description and accompanying drawings.

BRIEF DESCRIPTION OF THE DRAWINGS

The present disclosure may take form in various system and method components and arrangement of system and method components. The drawings are only for purposes of illustrating exemplary embodiments and are not to be construed as limiting the disclosure.

DETAILED DESCRIPTION

Figure 1:
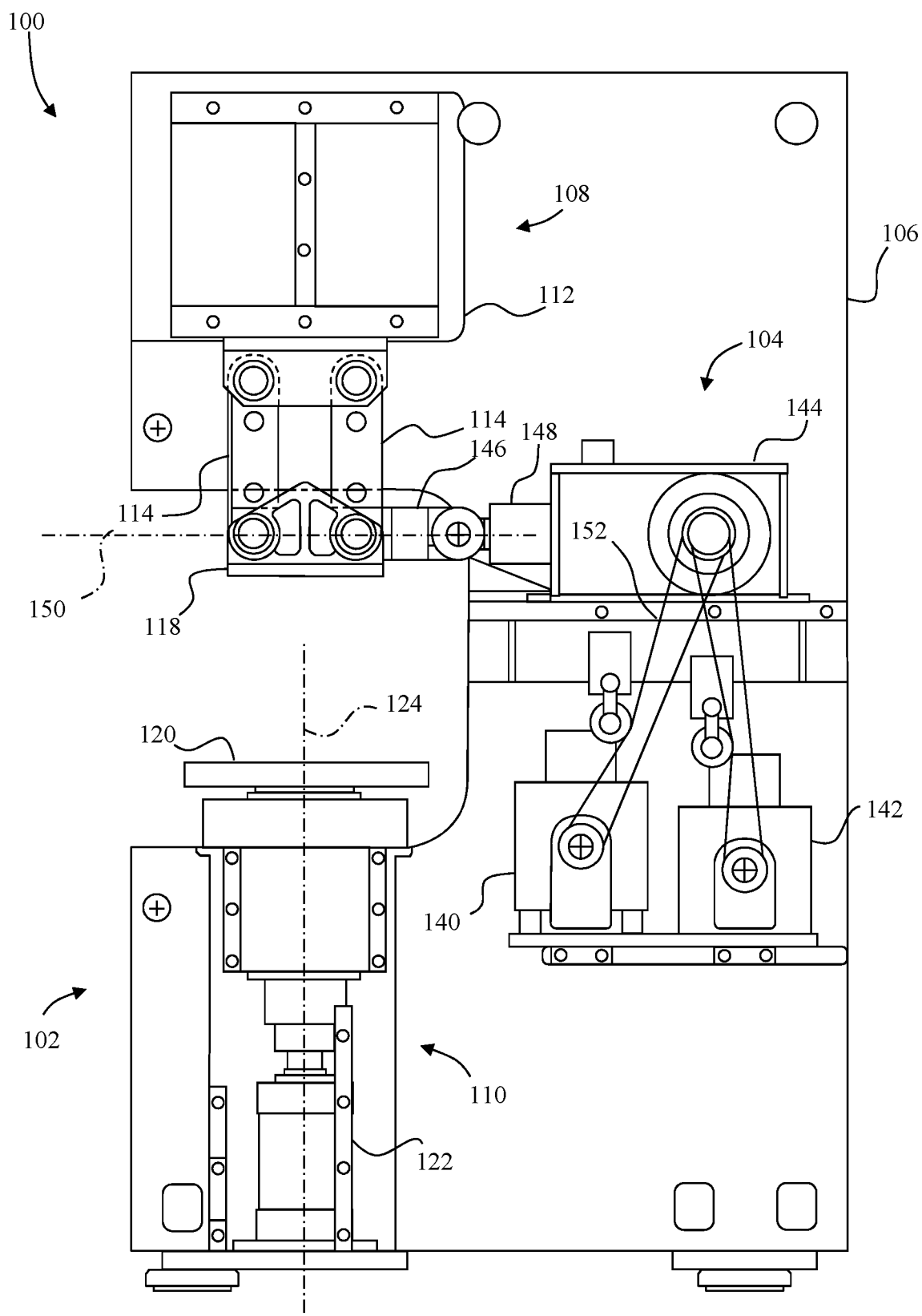
FIG. 1 depicts a partial side plan view of a linear friction welding system in accordance with principles of the disclosure.

Referring to FIG. 1, a linear friction welding system 100 includes a pressing assembly 102 and a vibrating assembly 104 positioned within a frame 106. The pressing assembly 102 includes an upper assembly 108 and a lower assembly 110. The upper assembly includes a base 112, and two rocker arm pairs 114 and 116 supporting a carriage 118 as further shown in FIG. 2 wherein the vibrating assembly 104 is removed for clarity.

Figure 2:
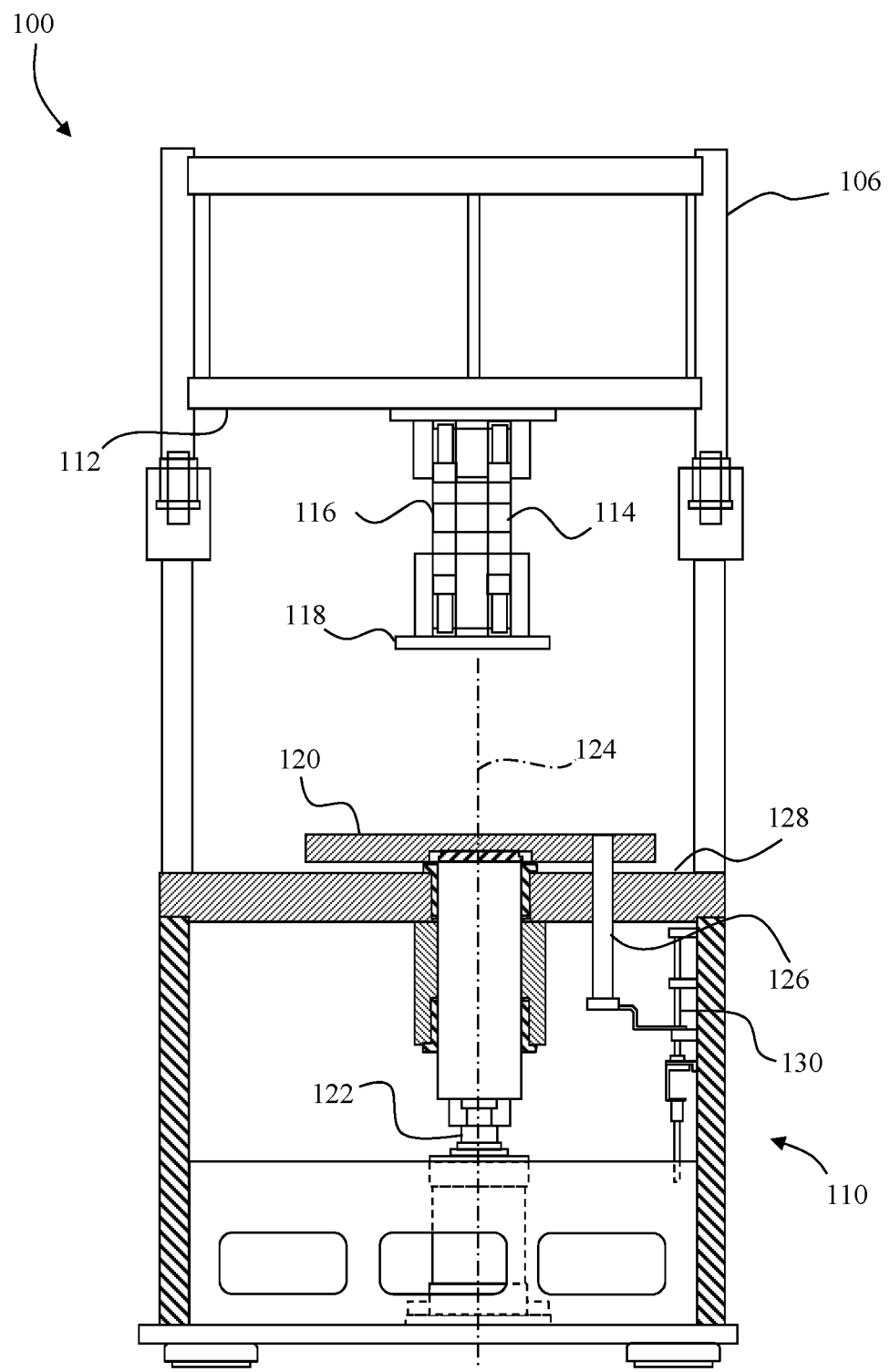
FIG. 2 depicts a partial front cross-sectional view of the system of FIG. 1.

Continuing with FIG. 2, the lower assembly 110 is generally aligned with the carriage 118 and includes a forge platen 120 supported above a main hydraulic press 122. The main hydraulic press 122 defines a press axis 124. An anti-rotation rod 126 extends from the forge platen 120 through a lower support plate 128. A sensor 130 is associated with the anti-rotation rod 126. In one embodiment, the sensor 130 is a linear voltage displacement transducer (LVDT).

Referring to FIG. 1, the vibrating assembly 104 includes a motor 140, a motor 142, a cam assembly 144, and a ram 146. The ram 146 is pivotably connected to the carriage 118 at a forward end and is pivotably connected to the cam assembly 144 at the opposite end through a connecting rod 148. The ram 146 is configured for movement along a weld axis 150. Additional details are available in the '039 patent.

Figure 3:
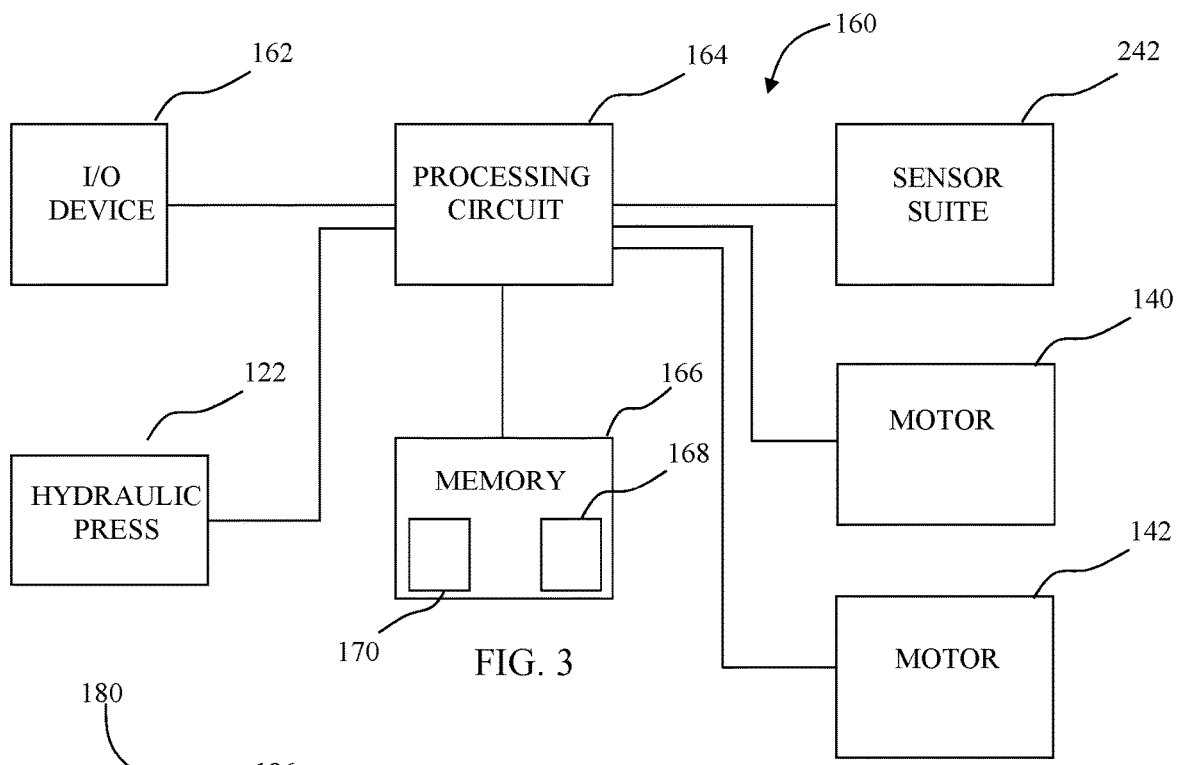
FIG. 3 depicts a schematic view of a control system of the linear friction welding system of FIG. 1.

The linear friction welding system 100 also includes a welding control system 160 depicted in FIG. 3. The control system 160 includes an I/O device 162, a processing circuit 164 and a memory 166. Program instructions 168 and parameter databases 170 are stored within the memory 166. The control system 160 is operably connected to the main hydraulic press 122, the motor 140, the motor 142, and a sensor suite 242 which includes the sensor 130. In some embodiments, one or more of the components of the system 160 are provided as a separate device which may be remotely located from the other components of the system 160.

The I/O device 162 in some embodiments includes a user interface, graphical user interface, keyboards, pointing devices, remote and/or local communication links, displays, and other devices that allow externally generated information to be provided to the control system 160, and that allow internal information of the control system 160 to be communicated externally.

The processing circuit 164 may suitably be a general purpose computer processing circuit such as a microprocessor and its associated circuitry. The processing circuit 164 is operable to carry out the operations attributed to it herein. The program instructions 168, some of which are described more fully below, are executable by the processing circuit 164 and/or any other components of the control system 160 as appropriate.

Many components in the above described linear friction welding system 100 are similar to, and work in like manner as, components in the system described in detail in the '039 patent and are not further discussed in detail herein. The program instructions 168 and the parameter databases 170 differ, however, from the program instructions and databases in the '039 patent. Specifically, the program instructions 168 and the parameter databases 170 are modified as discussed in more detail below to provide for linear friction welding of components wherein at least one of the components has a shape charge.

Figure 4:
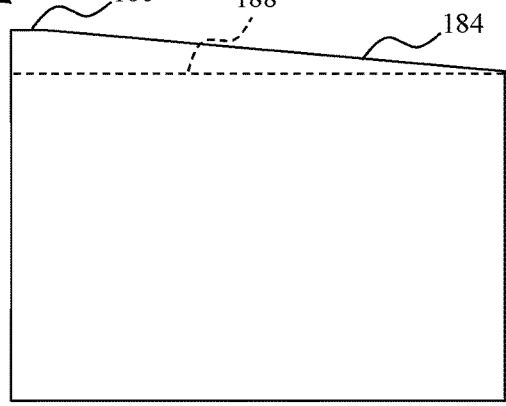
FIG. 4 depicts a side plan view of a component with a shaped charge portion.
Figure 5:
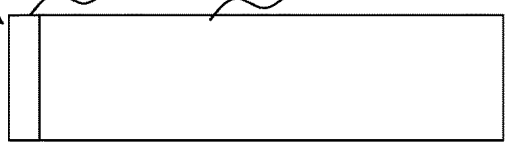
FIG. 5 depicts a top plan view of the component of FIG. 4.
Figure 6:
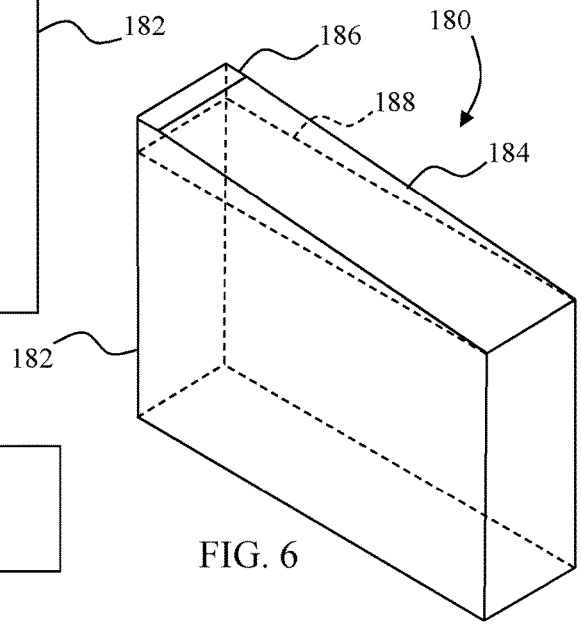
FIG. 6 depicts a perspective view of the component of FIG. 4.

A "shape charge" as used herein is portion of a component which is shaped and sized to provide a controlled preheating of a component to be welded by controlled deformation of the shaped charge portion. By way of example, FIGS. 4-6 depict a component 180 which includes a base portion 182 and a shaped charge portion 184. The shaped charge portion 184 includes a contact initiation portion 186. Also depicted in FIGS. 4 and 6 is a boundary plane 188 between the base portion 182 and the shaped charge portion 184.

The contact initiation portion 186 has a surface area, referred to herein as the "initial surface area ($A_0$)" which provides the initial contact between two components to be welded. The boundary plane 188 is a plane which is typically parallel to the contact initiation portion 186 and has a surface area, referred to herein as the "final surface area ($A_1$)" which substantially defines the weld interface when the component is welded to another component. The greatest distance between the initial surface area ($A_0$) and the final surface area ($A_1$) measured on a line perpendicular to the initial surface area ($A_0$) and the final surface area ($A_1$) is referred to herein as Shaped Charge Height (SCH). As a scrub progresses, the area of the shaped charge portion in contact with the opposing component grows from the initial surface area ($A_0$) to the final surface area ($A_1$) as the shaped charge portion is deformed.

Figure 7:
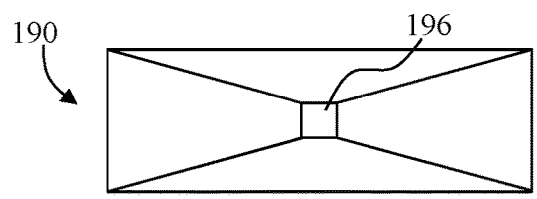
FIG. 7 depicts a top plan view of a component with a shaped charge portion.
Figure 9:
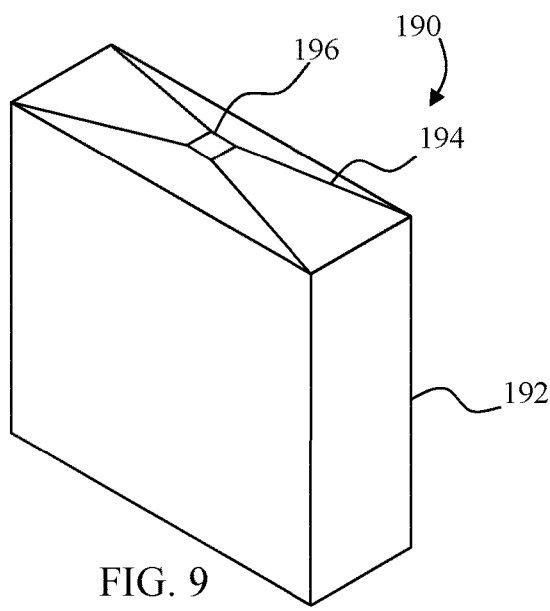
FIG. 9 depicts a perspective view of the component of FIG. 7.
Figure 8:
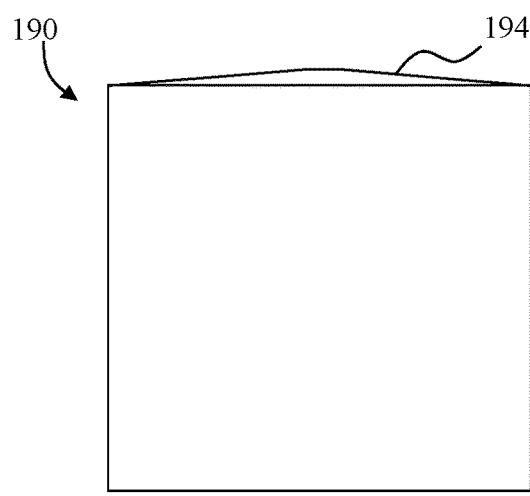
FIG. 8 depicts a side plan view of the component of FIG. 7.
Figure 10:
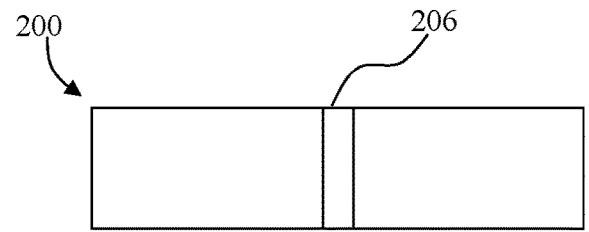
FIG. 10 depicts a top plan view of a component with a shaped charge portion.
Figure 12:
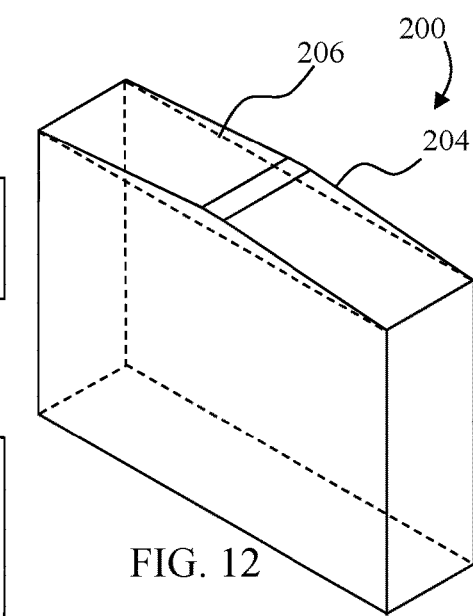
FIG. 12 depicts a perspective view of the component of FIG. 10.
Figure 11:
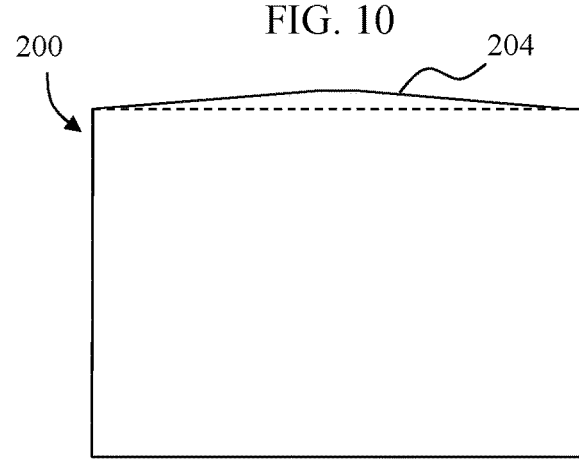
FIG. 11 depicts a side plan view of the component of FIG. 10.

It is to be appreciated that while the contact initiation portion 186 in the embodiment of FIGS. 4-6 is located at one end of the component 180 and exhibits a rectangular shape, the contact initiation portions for other components exhibit different shapes and locations and the shape of the shaped charge portion varies as well. Thus, FIGS. 7-9 depict a component 190 with a base portion 192 and a shaped charge portion 194. The shaped charge portion 194 exhibits a pyramidal shape and includes a centrally located contact initiation portion 196 shaped as a square. FIGS. 10-12 depict a component 200 with a base portion 202 and a shaped charge portion 204. The shaped charge portion 204 includes a centrally located contact initiation portion 206 shaped as a rectangle.

Other shapes and configurations for both the base portion and the contact initiation portion are incorporated in other components. The particular shape and configuration of the shaped charging portion, including the SCH, the size of the contact initiation portion, the location of the contact initiation portion, and the mass of the shaped charge portion are selected based upon the heat transfer characteristics of the particular component and the extent and location of preheating desired. Accordingly, the shape of the component influences the configuration of the shaped charge portion. Typical SCH values are about 0.03 inches but for some combinations is about 0.150 inches.

The shaped charge portion is used in conjunction with a modified scrub phase to provide for controlled preheating of a weld component. Rather than applying a full scrub pressure to two components to be welded, in the modified scrub phase the scrub load is varied. While the precise load setting can be selected depending upon the particular material(s) to be welded and the particular geometry of the components, in one embodiment the target scrub load pressure ($L_{scrub}$) is set at 75% of a weld load pressure ($L_{weld}$) to be applied during weld formation. In other embodiments the scrub load pressure is set to within a range of 25-100% (inclusive) of the weld load pressure ($L_{weld}$).

The initial contact between the components to be welded occurs at the initial contact initiation portion. In configurations wherein there are multiple contact initiation portions on one or both of the components to be welded, the contact initiation portion(s) with the greatest SCH will dictate the initial contact area.

The initial scrub load pressure ($L_0$) in one embodiment is calculated using the following equation:

$$L_0 = \frac{A_0}{A_1} L_{scrub}$$

In other embodiments, the initial scrub load pressure ($L_0$) is simply set at a pressure less than the target scrub load ($L_{scrub}$) since the initial surface area ($A_0$) is less than the final surface area ($A_1$) so long as a shaped charge portion is provided. In either approach, the load is then controlled throughout the scrub phase such that at the end of the scrub phase the load is at $L_{scrub}$.

Different approaches are used to control the load pressure throughout the scrub phase. In some embodiments, the load is varied based upon time. This approach is useful in machines which do not have sufficient controls/sensors to support more complicated processes. In general, a time based load variation for a single contact initiation portion is accomplished using the following equation:

$$L_t = \left(t + \frac{(T-t)A_0}{A_1}\right)\frac{L_{scrub}}{T} \quad \text{(Equation 1)}$$

wherein:
$L_t$ is the load at time (t) after initiation of a scrub, and
T is the predetermined time duration of the scrub in seconds.
The above equation is modified for processes including multiple contact initiation portions of differing heights by the addition of terms.

For systems which include additional sensors, the control process for welding components including one or more shaped charge portions need not be based solely upon time and in some instances time is not used at all. For example, the system 100 includes a sensor 130 in the form of a linear voltage displacement transducer (LVDT). Typically, such sensors are used to determine weld quality. Specifically, the initial position of the forge platen 120 as two weld components came into contact can be stored and compared to the position of the forge platen 120 after a weld has been formed using the sensor 130. The difference between the two locations indicates a loss of material from the two components at the contact point of the two components. The "loss" amount indicates the quality of the weld. Introduction of a shaped charge portion, however, changes the manner in which the flash from the friction welding process is distributed.

Figure 13:
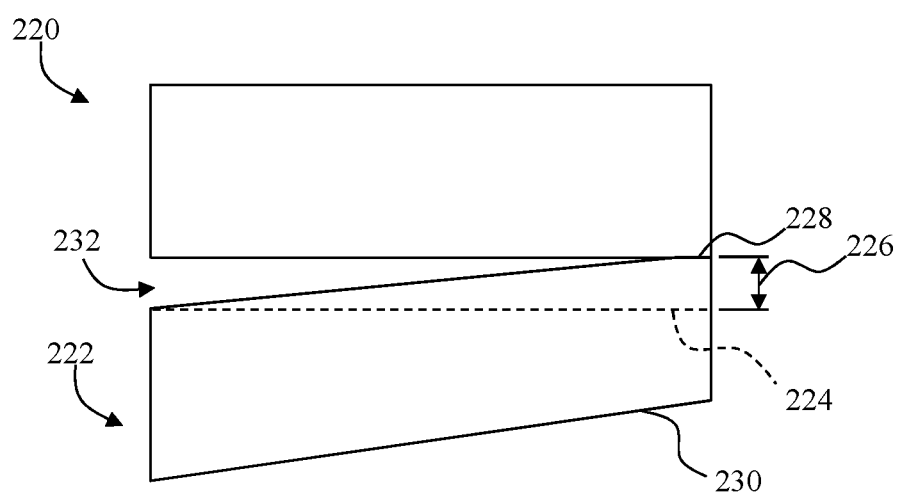
FIG. 13 depicts a side plan view of two components to be welded with the contact initiation portion of one component contacting the other component.

By way of example, FIG. 13 schematically depicts a component 220 and a component 222. The component 222 has a shaped charge portion 224 with a SCH 226 and a contact initiation portion 228 (the proportions have been exaggerated for clarity) above a base portion 230. When the contact initiation portion 228 is brought into contact with the component 220, at least one flash gap 232 is created at locations whereat the shaped charge portion is not in contact with the component 220. Accordingly, rather than being forced outwardly away from the area directly between the components 220 and 222, flash (melted material from the components 220/222) is forced down the side of the shaped charge portion and along the bottom of the component 220. The flash within the flash gap 232 provides a controlled transfer of heat into the component 220 and into the shaped charge portion 224 which is not in contact with the component 220 thereby preheating the shaped charge portion 224 as well as the underlying base portion 230.

Accordingly, while a typical linear weld results in about $^{10}/_{1000}$ of an inch travel distance of the forge platen 120, the shaped charge portion increases the distance that the forge platen 120 travels during a welding process. Therefore, the travel associated with an "acceptable" weld in some embodiments is adjusted based upon the particular SCH of the shaped charge portion while using the travel distance during the scrub to control the scrub load.

Control of the scrub load using travel distance of the forge platen is accomplished based upon the following equation:

$$L_d = \left(d + \frac{(SCH-d)A_0}{A_1}\right)\frac{L_{scrub}}{SCH} \quad \text{(Equation 2)}$$

wherein:

$L_d$ is the load (L) at distance (d) over which the forge platen has travelled after initial contact between the contact initiation portion of one component and a second component.

Figure 14:
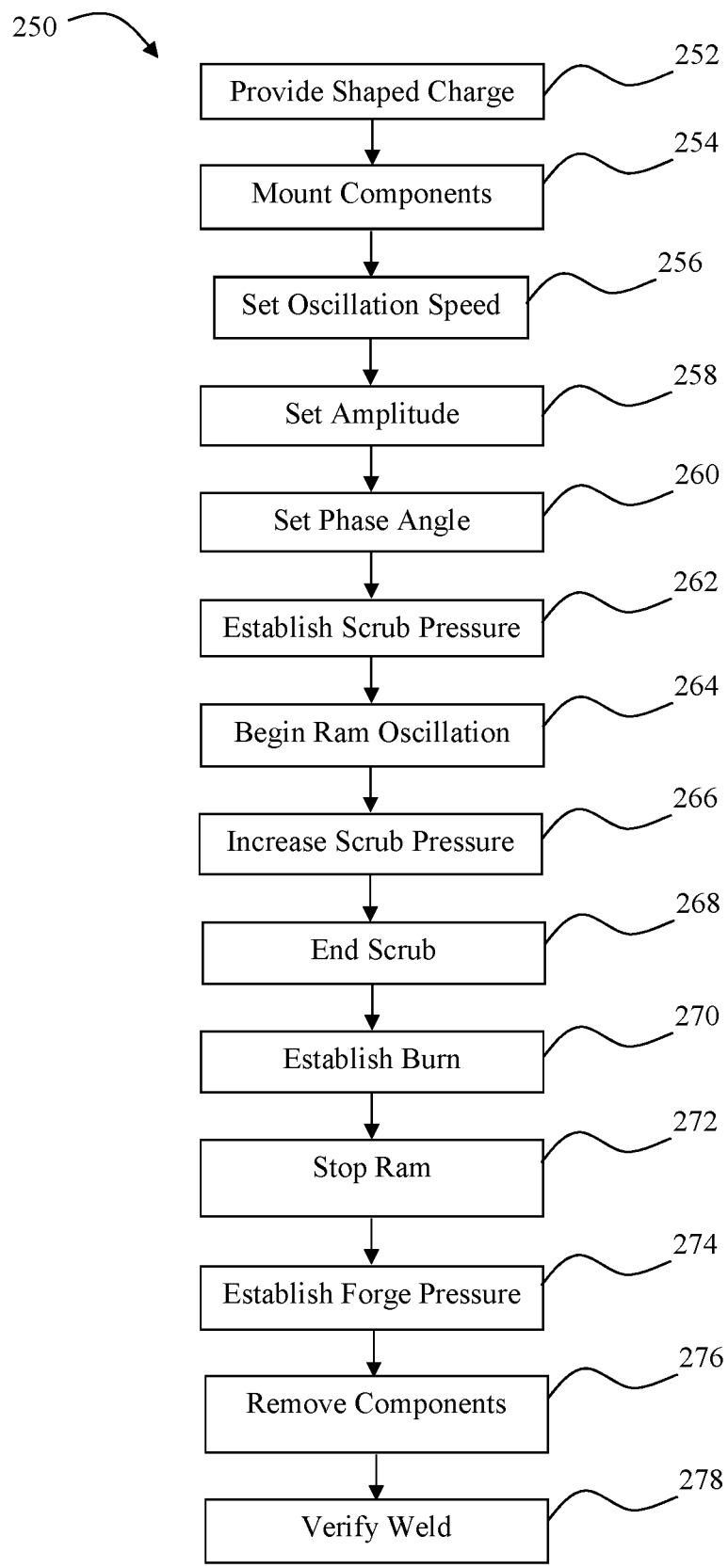
FIG. 14 depicts a procedure that can be executed under the control of the control system of FIG. 3 to form a welded unit with the linear friction welding system of FIG. 1 using at least one component with at least one shaped charge portion.

Additional details of the linear friction welding system 100 are provided with reference to a method 250 in FIG. 14, portions of which are performed under the control the control system 160. At block 252, at least one of two components to be welded is provided with a shaped charge portion. At block 254 one of the components to be welded is mounted to the forge platen 120 and the other component is mounted to the carriage 118, although in some embodiments this is done later in the process.

At block 256 the desired oscillation frequency is identified. Since the rotational speed of the motors 140/142 sets the oscillation frequency, in some embodiments, the motors 140 and 142 have a set speed which is selected based upon the particular components/materials to be welded. In other embodiments, one or more of the motors 140/142 have a variable speed capability, and parameters for the desired speed for the particular components/materials are stored in the parameter databases 170. At block 258, the amplitude for the welding operation is identified.

Once the desired speed and amplitude are identified, the system phase angle is set to zero with the motors 140 and 142 rotating under the control of the welding control system 160. (Block 260). Specifically, the processing circuit 164 executes the program instructions 168 stored in the memory 166 to access the settings for the motors 140/142 and controls the motors 140/142 based upon the obtained setting. As discussed in the '039 patent, this results in no movement of the ram 146.

At block 262 the processing circuit 164 executes program instructions 168 to establish an initial scrub load pressure ($L_0$) between the components to be welded by control of the hydraulic press 122. In some embodiments, the scrub profile is stored in the parameter databases. In other embodiments the processing circuit executes the program instructions to calculate the $L_0$ using a desired equation such as equation 1 or equation 2 above. The control system 160 then controls the motors 140/142 to set a non-zero system phase angle resulting in oscillation of the ram 146 to perform the scrub (block 264) as discussed more fully in the '039 patent.

Once the ram is oscillating, the scrub pressure is increased during the scrub using, e.g., a time based method (equation 1) or a sensor based method (equation 2). (Block 266). As the scrub is performed, a "wiping action" is generated by the linear friction welding system 100 as discussed more fully in the '039 patent.

When the load reaches the target scrub load pressure ($L_{scrub}$) and the desired scrub has been completed at block 268, in some embodiments burn parameters are established in the linear friction welding system 100 at block 270. Specifically, the processing circuit 164 controls the main hydraulic press 122 to achieve a desired burn pressure based upon a value stored in the parameters database 170.

Once the burn pressure has been established, a burn timer is started and counted down using a system clock or other appropriate clock. During the burn, the processing circuit 164 obtains input from the sensor suite 172 and controls the main hydraulic press 122 to maintain the desired burn pressure.

When the burn timer has expired or, in embodiments without a burn, the scrub is complete, movement of the ram 146 is terminated at block 272. Movement is terminated under the control of the processing circuit 160 by reversing the process which established the non-zero system phase angle so that a zero system phase angle is again established and the ram 146 no longer oscillates.

While the motors 140/142 rotate with no movement of the ram 146, the processing circuit 164 controls the main hydraulic press 122 to establish the weld load pressure ($L_{weld}$) at block 274 between the two weld components based upon data stored in the parameters database 170. The weld pressure applied to properly burned components which are not moving with respect to one another welds the two components together into a welded unit.

Once the components have been welded, the welded unit is removed (block 276) and the weld verified (block 278). If desired, the processing circuit 164 may be used to determine the weld quality. Specifically, the initial position of the forge platen 120 as the two weld components came into contact can be stored and compared to the position of the forge platen 120 after a weld has been formed using the sensor 130. The difference between the two locations indicates a loss of material from the two components at the contact point of the two components as discussed above.

Additionally, the temperature of the two components can be established, either by sensory input from the sensor suite 172 and/or by historic knowledge of the effects of the scrub and burn processes on the materials of the two components. Furthermore, the actual pressure, frequency, and amplitude of the procedure 250 provide precise information about the amount of energy placed into the components during the procedure 250. Consequently, the foregoing data may be used to calculate the amount of material lost due to flash and the nature of the weld formed.

The linear welding system 100 thus provides controlled preheating of components and precise and independent control of pressure applied as well as the frequency and amplitude of oscillation during the procedure 250. The use of a shaped charge portion and varied scrub pressure reduces the complexity of the system required for operation compared to other methods.

While the present disclosure has been illustrated by the description of exemplary processes and system components, and while the various processes and components have been described in considerable detail, the applicant does not intend to restrict or in any limit the scope of the appended claims to such detail. Additional advantages and modifications will also readily appear to those skilled in the art. The disclosure in its broadest aspects is therefore not limited to the specific details, implementations, or illustrative examples shown and described. Accordingly, departures may be made from such details without departing from the spirit or scope of applicant's general inventive concept. By way of example, while described with respect to a particular linear friction welding system, the shaped charge portion and scrub variation methods described above can be incorporated into any friction welding system.

The invention claimed is:

1. A linear friction welding system, comprising:
a ram configured to oscillate along a welding axis;
a hydraulic press; and
a welding control system operably connected to the hydraulic press, and the ram, the welding control system including
a memory,
program instructions stored within the memory,
a parameter database stored within the memory, and
a processing circuit operably connected to the memory and configured to execute the program instructions to establish an initial scrub load pressure ($L_0$) between the first component and the second component based upon a ratio between initial surface area ($A_0$) of a contact initiation portion of the shaped charge portion and a final surface area ($A_1$) of the first component, control the hydraulic press to increase pressure between the first component and the second component from the $L_0$ to a target scrub load pressure ($L_{scrub}$), terminate oscillation of the ram after establishing the $L_{scrub}$; and establish or maintain a weld load pressure ($L_{weld}$) after terminating oscillation of the ram.

2. The system of claim 1, wherein the $L_0$ is determined based upon the equation:

$$L_0 = \frac{A_0}{A_1} L_{scrub}.$$

3. The system of claim 2, wherein the $L_{scrub}$ is in the range of 0.25 $L_{weld}$ to 1.00 $L_{weld}$, inclusive.

4. The system of claim 3, wherein the processing circuit is configured to execute the program instructions to control the hydraulic press to increase pressure between the first component and the second component from the $L_0$ to the $L_{scrub}$ based upon a predetermined time duration of a scrub.

5. The system of claim 4, wherein the processing circuit is configured to execute the program instructions to control the hydraulic press to increase pressure between the first component and the second component from the $L_0$ to the $L_{scrub}$ based upon the predetermined time duration of the scrub based upon the equation:

$$L_t = \left(t + \frac{(T-t)A_0}{A_1}\right)\frac{L_{scrub}}{T}$$

wherein:
$L_t$ is the load at time (t) after initiation of the scrub, and
T is the predetermined time duration of the scrub in seconds.

6. The system of claim 3, further comprising:
a sensor configured to detect movement of the first component along an axis of the hydraulic press, the sensor operably connected to the processing circuit, wherein the processing circuit is configured to execute the program instructions to control the hydraulic press to increase pressure between the first component and the second component from the $L_0$ to the $L_{scrub}$ based upon detected movement of the first component during a scrub.

7. The system of claim 6, wherein the processing circuit is configured to execute the program instructions to control the hydraulic press to increase pressure between the first component and the second component from the $L_0$ to the $L_{scrub}$ based upon the detected movement of the first component during the scrub based upon the equation:

$$L_d = \left(d + \frac{(SCH-d)A_0}{A_1}\right)\frac{L_{scrub}}{SCH}$$

wherein:
$L_d$ is the load (L) at distance (d) over which the first component has travelled after initial contact between the contact initiation portion of the first component and the second component; and
SCH is the shaped charge height as measured along the axis of the hydraulic press.

8. A method of welding a first component to a second component using a linear friction welding system, comprising:

bringing a shaped charge portion of the first component into contact with the second component;

establishing an initial scrub load pressure ($L_0$) between the first component and the second component based upon a ratio between an initial surface area ($A_0$) of a contact initiation portion of the shaped charge portion and a final surface area ($A_1$) of the first component by controlling a hydraulic press with a processing circuit of a welding control system which executes program instructions stored within a memory;

controlling the hydraulic press with the processing circuit to increase pressure between the first component and the second component from the $L_0$ to a target scrub load pressure ($L_{scrub}$) based upon parameters stored in a memory;

controlling, with the processing circuit, a ram operably connected to one of the first component and the second component to terminate oscillation of the ram after establishing the $L_{scrub}$; and controlling the hydraulic press with the processing circuit to establish or maintain a weld load pressure ($L_{weld}$) after terminating oscillation of the ram.

9. The method of claim 8, wherein the $L_0$ is determined based upon the equation:

$$L_0 = \frac{A_0}{A_1} L_{scrub}.$$

10. The method of claim 9, wherein the $L_{scrub}$ is in the range of 0.25 $L_{weld}$ to 1.00 $L_{weld}$, inclusive.

11. The method of claim 10, wherein controlling the hydraulic press to increase pressure comprises:
executing the program instructions with the processing circuit to control the hydraulic press to increase pressure between the first component and the second component from the $L_0$ to the $L_{scrub}$ based upon a predetermined time duration of a scrub.

12. The method of claim 11, wherein controlling the hydraulic press to increase pressure further comprises:
executing the program instructions with the processing circuit to control the hydraulic press to increase pressure between the first component and the second component from the $L_0$ to the $L_{scrub}$ based upon the time duration of the scrub based upon the equation:

$$L_t = \left(t + \frac{(T-t)A_0}{A_1}\right)\frac{L_{scrub}}{T}$$

wherein:
$L_t$ is the load at time (t) after initiation of the scrub, and
T is the predetermined time duration of the scrub in seconds.

13. The method of claim 10, further comprising:
detecting with a sensor movement of the first component along an axis of the hydraulic press, wherein controlling the hydraulic press to increase pressure comprises:
executing the program instructions with the processing circuit to control the hydraulic press to increase pressure between the first component and the second component from the $L_0$ to the $L_{scrub}$ based upon the detected movement of the first component.

14. The method of claim 13, wherein controlling the hydraulic press to increase pressure further comprises:
executing the program instructions with the processing circuit to control the hydraulic press to increase pressure between the first component and the second component from the $L_0$ to the $L_{scrub}$ based upon the detected movement of the first component based upon the equation:

$$L_d = \left(d + \frac{(SCH - d)A_0}{A_1}\right)\frac{L_{scrub}}{SCH}$$

wherein:
$L_d$ is the load (L) at distance (d) over which the first component has travelled after initial contact between the contact initiation portion of the first component and the second component; and
SCH is the shaped charge height.

* * * * *